United States Patent
Hosono et al.

(10) Patent No.: US 10,695,751 B2
(45) Date of Patent: Jun. 30, 2020

(54) LAVES PHASE INTERMETALLIC COMPOUND, CATALYST USING INTERMETALLIC COMPOUND, AND METHOD FOR PRODUCING AMMONIA

(71) Applicants: JAPAN SCIENCE AND TECHNOLOGY AGENCY, Kawaguchi-shi (JP); TOKYO INSTITUTE OF TECHNOLOGY, Tokyo (JP)

(72) Inventors: Hideo Hosono, Tokyo (JP); Toshiharu Yokoyama, Tokyo (JP); Masaaki Kitano, Tokyo (JP); Hiroshi Mizoguchi, Tokyo (JP); Takaya Ogawa, Tokyo (JP)

(73) Assignees: JAPAN SCIENCE AND TECHNOLOGY AGENCY, Kawaguchi-shi (JP); TOKYO INSTITUTE OF TECHNOLOGY, Tokyo (JP)

(*) Notice: Subject to any disclaimer, the term of this patent is extended or adjusted under 35 U.S.C. 154(b) by 178 days.

(21) Appl. No.: 15/760,072

(22) PCT Filed: Sep. 15, 2016

(86) PCT No.: PCT/JP2016/077313
§ 371 (c)(1),
(2) Date: Mar. 14, 2018

(87) PCT Pub. No.: WO2017/047709
PCT Pub. Date: Mar. 23, 2017

(65) Prior Publication Data
US 2018/0257061 A1 Sep. 13, 2018

(30) Foreign Application Priority Data
Sep. 15, 2015 (JP) ................. 2015-181607

(51) Int. Cl.
*B01J 23/63* (2006.01)
*C22C 5/04* (2006.01)
(Continued)

(52) U.S. Cl.
CPC ............. *B01J 23/63* (2013.01); *B01J 35/023* (2013.01); *B01J 37/0081* (2013.01);
(Continued)

(58) Field of Classification Search
CPC ...... B01J 23/63; B01J 35/023; B01J 37/0081; C22C 5/04; C01C 1/0411; Y02P 20/52
See application file for complete search history.

(56) References Cited

U.S. PATENT DOCUMENTS

| | | |
|---|---|---|
| 3,185,900 A | 5/1965 | Jaccarino et al. |
| 3,684,495 A | 8/1972 | Wilhelm et al. |

(Continued)

FOREIGN PATENT DOCUMENTS

| | | |
|---|---|---|
| JP | 2-258066 A | 10/1990 |
| JP | 6-79177 A | 3/1994 |

(Continued)

OTHER PUBLICATIONS

Niitaka et al., Comprehensive Macroscopic Investigation on Hexagonal C14 Laves-Type Ru—Based Superconductors Ru (= Lu, Y, Sc) with Effective Electron Correlation, Journal of the Physical Society of Japan ISSN: 0031-9015 Date: Dec. 2013 vol. 82 Issue: 12 p. 124703-124703/10 (Year: 2013).*

(Continued)

*Primary Examiner* — Anthony J Zimmer
(74) *Attorney, Agent, or Firm* — Oblon, McClelland, Maier & Neustadt, L.L.P.

(57) ABSTRACT

The invention provides a Laves phase intermetallic compound having a composition represented by general formula $ARu_2$ (A is Y, Sc, or at least one element selected from (Continued)

lanthanoid elements excluding Ce), the crystallite size thereof being 1 nm to 100 nm; a catalyst including the intermetallic compound as an active ingredient; and a method for producing ammonia using the same.

10 Claims, 3 Drawing Sheets

(51) Int. Cl.
 *B01J 37/00* (2006.01)
 *B01J 35/02* (2006.01)
 *C01C 1/04* (2006.01)
(52) U.S. Cl.
 CPC .............. *C01C 1/0411* (2013.01); *C22C 5/04* (2013.01); *Y02P 20/52* (2015.11)

(56) References Cited

U.S. PATENT DOCUMENTS

| | | |
|---|---|---|
| 4,325,931 A | 4/1982 | Lewis |
| 2004/0057891 A1 | 3/2004 | Nielson et al. |
| 2013/0183224 A1 | 7/2013 | Hosono et al. |

FOREIGN PATENT DOCUMENTS

| | | |
|---|---|---|
| JP | 9-239272 A | 9/1997 |
| JP | 2004-35399 A | 2/2004 |
| JP | 2005-268750 A | 9/2005 |
| JP | 2006-231229 A | 9/2006 |
| WO | WO 2012/077658 A1 | 6/2012 |

OTHER PUBLICATIONS

International Search Report dated Nov. 1, 2016 in PCT/JP2016/077313 (with English language translation) citing references AB-AC, AH, and AR therein, 4 pages.

T. Takeshita, et al. "Rare Earth Intermetallics as Synthetic Ammonia Catalysts", Journal of Catalysis, vol. 44, 1976, pp. 236-243.

W. E. Wallace, "Rare Earth and Actinide Intermetallics as Hydrogenation Catalysts", Proceedings of an International Symposium Held in Gelio, 1977, pp. 501-514.

Hai-Yan Zhu, °Room temperature catalytic ammonia synthesis over an $AB_5$-type intermetallic hydride°, Journal of Alloys and Compounds, vol. 240, 1996, pp. L1-L3.

Andrew P. Walker, et al. "Structure and Reactivity of Ammonia Synthesis Catalysts Derived from $CeRu_2$ Precursors: A Study by in Situ X-Ray Absorption Spectroscopy", Journal of Catalysis, vol. 125, No. 1, 1990, pp. 67-76.

Ryoichi Kojima, et al. "Rhenium containing binary catalysts for ammonia synthesis", Applied Catalysis A: General, vol. 209, 2001, pp. 317-325.

Ryoichi Kojima, et al. "Cesium-promoted rhenium catalysts supported on alumina for ammonia synthesis", Applied Catalysis A: General, vol. 246, 2003, pp. 311-322.

Stacey E. Siporin, et al. "Use of kinetic models to explore the role of base promoters on Ru/MgO ammonia synthesis catalysts", Journal of Catalysis, vol. 225, 2004, pp. 359-368.

Masaaki Kitano, et al. "Ammonia synthesis using a stable electride as an electron donor and reversible hydrogen store", Nature Chemistry, vol. 4, 2012, pp. 934-940.

Meng Fu, et al. "Study of the Enhancement of Magnetic Properties of NdFeR Materials Fabricated by Modified HDDR Process", Journal of Magnetics, vol. 9, No. 4, 2004, pp. 109-112.

* cited by examiner

BEFORE TREATMENT

AFTER TREATMENT

LAVES PHASE INTERMETALLIC COMPOUND, CATALYST USING INTERMETALLIC COMPOUND, AND METHOD FOR PRODUCING AMMONIA

TECHNICAL FIELD

The present invention relates to an intermetallic compound having a Laves phase (hereinafter referred to as "Haves phase intermetallic compound"), a catalyst containing the intermetallic compound as an active component, and a method for producing ammonia using the intermetallic compound.

This application claims priority right based on Japanese Patent Application No. 2015-181607 filed in Japan on Sep. 15, 2015, the content of which is hereby incorporated by reference.

BACKGROUND ART

As a typical ammonia synthesis method, the Haber-Bosch method uses doubly promoted iron containing several percent by mass of $Al_2O_3$ and $K_2O$ in $Fe_3O_4$ as a catalyst, and passes a mixed gas of nitrogen and hydrogen into contact with the catalyst under high temperature and high pressure conditions to produce ammonia. This technology is widely used industrially in the production process as almost the same as it was completed.

On the other hand, a method of producing ammonia at a temperature lower than the reaction temperature of the Haber-Bosch method has been studied. Catalysts capable of producing ammonia by contacting with nitrogen and hydrogen have been investigated, and transition metals have been studied as their catalytically active components. Among them, a method using ruthenium (Ru) as a catalyst active component on various catalyst supports and using it as a catalyst for ammonia synthesis has been proposed as an efficient method (for example, Patent Document 1).

It is known that a catalyst using a transition metal such as Ru has very high activity and ammonia can be produced under milder conditions than the reaction conditions used in the Harbor-Bosch method. For example, in the Harbor-Bosch method, a reaction temperature of 400° C. or higher and a reaction pressure of 20 MPa or higher are required, whereas with a catalyst using a transition metal, the reaction temperature is 200° C. or higher and 1.1 MPa or lower. It is known that the reaction proceeds even with a reaction pressure around atmospheric pressure.

As another ammonia synthesis catalyst, intermetallic compounds are also being studied. If an intermetallic compound of a transition metal such as Ru having high catalytic activity and another metal element is obtained, it can be expected to be an inexpensive catalyst.

Examples of intermetallic compounds which are active in ammonia synthesis include intermetallic compounds of alkali metals or alkaline earth metals and transition metals such as $CaNi_5$, $Mg_2Ni$ and $Mg_2Cu$ (Patent Document 2); and intermetallic compounds known as hydrogen storage alloys such as $CeFe_2$, $CeCo_2$ and $CeRu_2$ (Non-patent documents 1 and 2).

Specifically, Non-Patent Document 1 reports investigation results of ammonia synthesis using powders of intermetallic compounds such as $CeFe_2$, $CeRu_2$, $CeCo_2$ and the like prepared by a melting method as catalysts, instead of a simple metal catalyst has been done.

Also a method using a hydride $AB_5H_{\sim 6}$ obtained by reducing an intermetallic compound represented by an $AB_5$ type intermetallic compound as a catalyst is proposed. Specifically, it has been reported that it is possible to synthesize ammonia at room temperature by using hydride obtained by reducing intermetallic compound represented by the $AB_5$ type intermetallic compound as a catalyst, wherein A is a mischmetal containing La as a main component, B is an intermetallic compound of Ni and has a BET specific surface area of 0.02 $m^2/g$ (Non-Patent Document 3).

It is also known that a fine intermetallic compound can be obtained by absorbing hydrogen to be embrittled, crushed, and then removing hydrogen.

[Patent Document 1] Japanese Unexamined Patent Application Publication No. 2006-23129.
[Patent Document 2] U.S. Pat. No. 4,325,931.
[Non-Patent Document 1] Takeshita, T., Wallace, W. E., Craig, R. S., "Journal of Catalysis" 44, 236-243 (1976).
[Non-Patent Document 2] Wallace, W. E., "Proceedings of an International Symposium Held in Gelio", Norway, 14-19 August 1977 pages 501-514.
[Non-Patent Document 3] Hai-Yan Zhu, "Journal of Alloys and Compounds" 240(1996) L1-L3.

SUMMARY OF THE INVENTION

Since ruthenium having high catalytic activity is a noble metal and its specific gravity is large, the price per mass is very high. Therefore, in order to reduce the cost of the catalyst, it is desirable to reduce the amount of ruthenium used as much as possible. When Ru of the same mass is used, it is preferable to increase the surface area thereof, but it is difficult to increase the specific surface area of ruthenium by making it into fine particles due to the ductility of simple metals, and in particular, it is difficult to crush metal Ru physically. Therefore, it is difficult to produce fine particles of metal Ru which can exist stably under reaction conditions.

Furthermore, in ammonia synthesis, when a transition metal is used in a catalyst as a catalytically active component such as Ru or Re, hydrogen is competitively adsorbed to the catalyst because hydrogen bonds are strong. Therefore, there is a defect of causing hydrogen-poisoning that hydrogen is competitively adsorbed to the catalyst and as a result, adsorption of nitrogen is inhibited. Due to hydrogen poisoning, dissociation reaction of nitrogen molecules ($N_2$), which is an important elementary reaction in ammonia synthesis, is inhibited, therefore there is a problem that the ammonia synthesis activity is lowered.

Therefore, in the ammonia synthesis method using a catalyst containing a metal Ru as a catalytically active component, it is inevitable to perform the reaction under the condition that the hydrogen partial pressure is lowered, which is a disadvantageous condition in terms of the stoichiometric ratio.

It is known that the reaction order of hydrogen in the ammonia synthesis reaction at this time is approximately −0.2 to −1. A catalyst containing a transition metal as a catalytically active component has been studied for improving catalytic activity by supporting it on a catalyst support and adding an accelerator. However, since hydrogen reaction order is close to 0, and it is not positive, hydrogen poisoning has not been solved yet.

On the other hand, an intermetallic compound having high catalytic activity is produced by mixing a metal as an active center and an active metal such as a rare earth element in order to improve reactivity by electron donation to the metal as an active center.

However, it is difficult for an intermetallic compound containing a metal having a high electron-donating property such as a rare earth element as a constituent element to increase the specific surface area by general physical pulverization as described above.

In addition, since intermetallic compounds are often decomposed into nitrides of rare earth elements and simple transition metals at temperatures of about 300° C. to 400° C. used for the reaction temperature of ammonia synthesis reaction, it is scarce in stability and durability as a catalyst.

For example, as a result of the X-ray diffraction measurement after the ammonia synthesis reaction, it has been shown that the intermetallic compound used as a catalyst in Non-Patent Document 1 decomposes. From this experimental result, the simple substance of a transition metal such as Fe, Co, Ru shows catalytic activity.

Further, as shown in Non-Patent Document 2, during the ammonia synthesis reaction, $CeCo_3$, $CeRu_2$, $CeFe_2$ and the like are changed to a rare earth metal nitride and simple substances of the transition metal, and the simple substance of a transition metal such as Co, Ru, Fe or the like supported on a nitride of rare earth metal actually functions as a catalyst.

That is, in the ammonia synthesis reaction, development of an inexpensive catalyst which exhibits high catalytic activity and has hydrogen poisoning resistance and durability, is desired.

SUMMARY OF THE INVENTION

As a result of extensive studies to solve the above problems, the present inventors have found that a compound which can be used to produce an inexpensive catalyst exhibiting a high catalytic activity, and a catalyst can be obtained by manufacturing a Laves phase intermetallic compound of a metal Ru and a rare earth element and miniaturizing the crystallite of the intermetallie compound.

That is, the present invention is represented by the following [1] to [9].

[1] A Laves phase intermetallie compound having a composition represented by general formula $ARu_2$,
wherein A is Y, Se, or at least one element selected from lanthanoid elements excluding Ce; and
a crystallite size of the Laves phase intermetallic compound is 1 nm to 100 nm.

[2] A Laves phase intermetallic compound complex, comprising
a Laves phase intermetallic compound having a composition represented by general formula $ARu_2$, and
a catalyst support for supporting the intermetallic compound,
wherein A is Y, Se, or at least one element selected from lanthanoid elements excluding Ce; and
a crystallite size of the Laves phase intermetallic compound is 1 nm to 100 nm.

[3] A catalyst, comprising a Laves phase intermetallic compound having a composition represented by general formula $ARu_2$, as a catalyst active component,
wherein A is Y, Sc, or at least one element selected from lanthanoid elements excluding Ce; and
a crystallite size of the Laves phase intermetallic compound is 1 nm to 100 nm.

[4] The catalyst according to [3], wherein the catalyst active component is supported on a catalyst support.

[5] The catalyst according to [3] or [4], wherein the catalyst is a catalyst for producing ammonia.

[6] A method for producing ammonia by passing a gas containing hydrogen and nitrogen into contact with a catalyst,
wherein the catalyst is a catalyst comprising a Laves phase intermetallie compound having a composition represented by general formula $ARu_2$ as a catalyst active component,
wherein A is Y, Sc, or at least one element selected from lanthanoid elements excluding Ce; and
a crystallite size of the Laves phase intermetallic compound is 1 nm to 100 nm.

[7] The method for producing ammonia according to [6], wherein a reaction temperature of passing the gas containing hydrogen and nitrogen into contact with the catalyst is 200° C. or more.

[8] The method for producing ammonia according to [6] or [7],
wherein a reaction pressure of passing the gas containing hydrogen and nitrogen into contact with the catalyst is 10 kPa to 15 MPa.

[9] The method for producing ammonia according to any one of [6] to [8],
wherein a volume ratio of hydrogen to nitrogen ($H_2/N_2$, volume/volume) of passing the gas containing hydrogen and nitrogen into contact with the catalyst is 0.4 or more.

The Laves phase intermetallic compound of the present invention has a small crystallite site and a large BET specific surface area which cannot be obtained by mechanically pulverizing an intermetallic compound. Therefore, it is useful as a catalytically active component.

Since the catalyst of the present invention does not undergo decomposition particularly in the ammonia synthesis reaction, the activity, stability and durability which are not found in the conventional Ru metal-supported catalyst can be obtained.

In the method for producing ammonia according to the present invention, since hydrogen poisoning can be suppressed, it is also possible to supply raw material gas under advantageous conditions from the viewpoint of the stoichiometric ratio, and high ammonia production rate can be obtained.

Furthermore, since the composition ratio of ruthenium can be reduced, catalyst cost can be reduced.

DETAILED DESCRIPTION OF THE INVENTION

Figure 1:
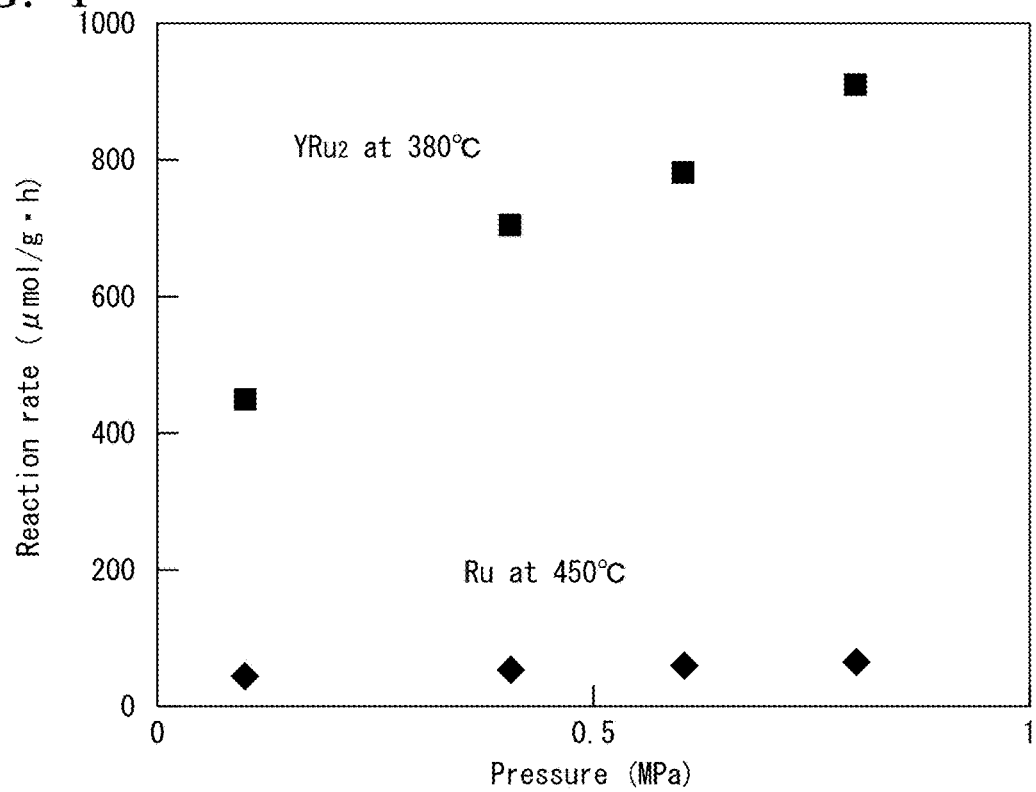
FIG. 1 is a diagram showing ammonia synthesis rates in Example 5 and Comparative Example 4.

The present invention will be described in detail below.

The term "powder" is defined as "an aggregate of particles having a maximum dimension of 1 mm or less" (JIS Z 2500: 2,000 powder metallurgical term), and which is used in the same meaning in this specification. Also, although not strictly defined, it may be "a powder having the particle size of several hundreds μm or more is called as a coarse powder, several hundreds to several tens of μm as ordinary powder, several tens to 1 μm as fine powder, 1 to 0.1 μm as submicron powder, and less than 0.1 μm as ultrafine powder" (Industrial Research Committee, item "POWDER" in Dictionary of Industrial Materials", first edition of 1997), and the term is used in the same meaning in this specification.

<Intermetallic Compound>

Intermetallic compounds are usually compounds composed of two or more kinds of metals.

Intermetallic compounds are generally known to have different crystal structures from the constituent metallic elements constituting the intermetallic compounds and have specific properties not found in the component metallic elements.

The atomic ratio of the metal elements constituting the intermetallic compounds is not particularly limited, but it may be an integer ratio. In the case of the intermetallic compounds represented by the composition formula, for example, in the case of an intermetallic compound composed of two kinds of metallic elements, when the constituent metallic elements are A and B, there is no particular limitation, but there is an intermetallic compound represented by the general formula $AB_5$, and those represented by the general formula $AB_2$.

The compound represented by the general formula $AB_2$ is known as a Laves phase intermetallic compound. The Laves phase is one of the phases of the intermetallic compound and may be composed of two kinds of metal elements A and B having different sizes, wherein the phase is formed when the ratio of the atomic radius Ra of atom A having a large atomic radius to the atomic radius Rb of a small atom B, Ra/Rb, is about 1.05 to 1.67. The intermetallic compound having such a phase is called a Laves phase intermetallic compound.

The Laves phase intermetallic compound of the present invention (hereinafter sometimes simply referred to as intermetallic compound of the present invention) is a compound represented by the general formula $ARu_2$ (A is Y, Sc, or one element selected from lanthanoid elements except Ce). Specifically, the lanthanoid elements excluding Ce are one or more lanthanoid elements selected from the group consisting of La, Pr, Nd, Sm, Eu, Gd, Tb, Dy, Ho, Er, Tm, Yb, and Lu.

That is, the Laves phase intermetallic compound of the present invention is a Laves phase intermetallic compound having Ru as an essential constituent, and the metal element as a counterpart thereof including yttrium (Y), scandium (Sc) or a lanthanoid element except for Ce. The metal element as a counterpart of Ru is preferably Y which is relatively easy to obtain and inexpensive.

The intermetallic compound of the present invention has a crystallite size of 1 to 100 nm. Preferably 2 to 90 nm, more preferably 5 to 75 nm, further preferably 5 to 50 nm. Due to this size, the intermetallic compound of the present invention can improve the catalytic activity while maintaining the properties of the intermetallic compound of the present invention, for example, when it is used as a catalyst.

In addition, for example, when it is used as a catalyst, a catalyst having a large surface area may be obtained, so that it is possible to improve the catalytic activity.

Here, the crystallite of the intermetallic compound of the present invention can be regarded as a single crystal in each particle. A single crystal is one in which the direction of atomic arrangement is the same in any part in a crystal. Also, one particle may be composed of a plurality of crystallites.

When the size of the crystallite is in the range of about 1 to about 100 nm, the crystallite size can be obtained based on the Scherrer formula from the half width of the peak of X-ray diffraction. As a measurement method, a method based on H 7805:2005 "Method for measuring crystallite diameter of metal catalyst by X-ray diffraction method" can be used. In addition, Rietveld analysis can also be obtained from the full width at half maximum of the X-ray diffraction peak in the range of about 1 to about 100 nm. The size of the crystallite larger than the above range can be obtained by using any one of the measurement methods.

The intermetallic compound of the present invention is not particularly limited, but may has cracks on its surface.

A crack is a partial split or a fissure appearing on the material surface and can be confirmed by a surface analyzer such as an electron microscope.

The amount of cracks is not particularly limited, but it is preferable that there are cracks in 20% or more of the total crystal.

Although the specific surface area of the intermetallic compound of the present invention is not particularly limited, and the specific surface area may be small to the extent that it is difficult to measure by the BET method, the surface area of the catalyst is preferably 0.5 $m^2/g$ or more, more preferably 1.0 $m^2/g$ or more, in view that the catalytic activity is proportional to the magnitude of the surface area, and the catalytic activity per mass is higher as the surface area is larger.

The shape of the intermetallic compound of the present invention are not particularly limited and may be any of lumps, powders, coatings, and the like, but it may be in the form of powder and regarding size, any one of rough powder, normal powder, fine powder, submicron powder and ultrafine powder may be used, but a fine powder having a size of about 50 μm to 1 μm is preferable.

The method of producing the intermetallic compound of the present invention is not particularly limited as long as the effect is obtained, but it may be produced according to the following method.

First, a first step includes a step of producing the intermetallic compound $ARu_2$ of the present invention from metal atom sources which are a components of the intermetallic compound of the present invention.

A subsequent second step includes a step of passing the crystallite size of the intermetallic compound $ARu_2$ into a predetermined range.

<Production of $ARu_2$>

The method for producing the intermetallic compound of the present invention is not particularly limited, but it may be produced by melting and mixing the metal A and the metal Ru which are the constituent components.

An raw materials ratio at the time of production is not limited as long as the intermetallic compound of the present invention can be obtained, but it may be adjusted so as to be 1:2 which is the composition molar ratio thereof.

There are no particular restrictions on the method of melting and mixing the raw materials of the metals, for example, any one of the following methods of melting and mixing the raw materials of the metals can be selected appropriately: melting and mixing raw material metals by the are melting method; calcination in an electric furnace such as a high frequency furnace of raw material metal; microwave fusion synthesis of raw material metals by microwave oven etc.; mechanical alloying of metal A particles and metal Ru particles; spraying raw material metal melt; a reduction diffusion method in which an oxide powder of metal A and a metal Ru powder are mixed and the rare earth element oxide is reduced by heating it in the vapor of a reducing metal such as calcium to diffuse into the metal Ru; combine hydrogenated metal A powder and metal Ru powder by mixing, sputtering or the like, decompress to a vacuum state at high temperature, and extract hydrogen from metal A.

In addition, the intermetallic compound of the present invention can be produced as a film by sputtering, vapor deposition, or a method of applying a solution of a metal compound as a raw material for an intermetallic compound to a carrier and reducing it by heating.

Among them, the are melt method is preferably used because of its simplicity of operation.

The are melt method is a method in which the metal is placed in a vacuum and then the metal is dissolved and mixed by are discharge.

Although the conditions at this time are not particularly limited, in general, in order to prevent oxidation of the metal as a raw material, the treatment is carried out in an oxygen-free atmosphere, preferably under an Ar atmosphere in which discharge is likely to occur.

The pressure at the time of melting is not particularly limited, but it may be carried out under a low pressure so that discharge easily occurs, preferably 0.1 or less, and more preferably 0.05 MPa or less.

The voltage and the like at the time of are discharge are not particularly limited as long as melting and mixing occur, and can be appropriately selected according to the kind of the raw material and the amount thereof. Then, the molten metal is cooled to room temperature. The resulting $ARu_2$ may be lumpy. By pulverizing it, $ARu_2$ may be made to have a preferable particle diameter. Both mechanical pulverization and physical pulverization can be used for pulverization.

<Step of making the Crystallite Size of $ARu_2$ into a Predetermined Range>

A second step of the method for producing the intermetallic compound of the present invention includes a step of making the crystallite of $ARu_2$ obtained in the first step to a size of 1 to 100 nm. Here, $ARu_2$ obtained in the first step may be reinafter be referred to as "raw material $ARu_2$" in some cases.

The method is not particularly limited, and a method of increasing the so-called crystallite surface area is used.

It may be difficult to make the raw material $ARu_2$ into a fine particle form by a usual physical method. Therefore, it may be preferable to perform a treatment by hydrogen adsorption-desorption (hereinafter referred to as hydrogen adsorption-desorption treatment) to the raw material $ARu_2$.

Hereinafter, the hydrogen adsorption-desorption treatment will be described in detail.

First, the raw material $ARu_2$ is placed in an atmosphere having a high hydrogen partial pressure to adsorb hydrogen. The hydrogen partial pressure during the adsorption is not particularly limited, but it is preferably in the range of normal pressure to 10 MPa. Although the temperature at the time of adsorption is not particularly limited, it may be room temperature to 500° C., preferably 300° C. to 500° C. from the viewpoint that $ARu_2$ does not decompose and sufficiently adsorb hydrogen. Further, although the temperature during adsorption may be constant or may be changed, by raising the temperature to a certain holding temperature with a rapid temperature change from room temperature and holding for a certain period of time, cracks are likely to occur on the surface of $ARu_2$. It is preferable that it can increase the BET specific surface area. Although the rate of temperature rise at this time is not particularly limited, it may be raised at 5° C./min or more, preferably 10° C./min or more. The holding temperature is not particularly limited, but may be 300° C. to 500° C. The holding time after raising the temperature is not particularly limited, but it may be 10 minutes to 5 hours.

Next, after $ARu_2$ in which hydrogen has been absorbed is cooled to room temperature and is placed in a vacuum state, the adsorbed hydrogen is desorbed. The pressure in the vacuum state is not particularly limited, but it may be a hydrogen partial pressure of 10 kPa or less. The temperature at which desorption is carried out is not particularly limited, but it may be high temperature, specifically, it may be room temperature or more, preferably 300° C. to 500° C.

The temperature at which hydrogen is desorbed may be constant or may be changed, but by raising the temperature to a certain holding temperature with a rapid temperature change from room temperature and holding for a certain period of time, cracks are formed on the surface of $ARu_2$. As a result, the BET specific surface area can be increased, which is preferable.

Although the rate of temperature rise at this time is not particularly limited, it may be raised at 5° C./min or more, preferably 30° C./min or more. The holding temperature is not particularly limited, but may be 300° C. to 500° C. The holding time after raising the temperature is not particularly limited, hut it may be 10 minutes to 5 hours.

Since $ARu_2$ used in the present invention may have a property of adsorbing hydrogen, it is considered that hydrogen embrittlement and miniaturization will occur by going through the aforementioned hydrogen adsorption-desorption treatment.

As a result, the surface area of the intermetallic compound of the present invention increases.

Although the shape of the intermetallic compound of the present invention obtained through the hydrogen adsorption-desorption treatment is not particularly limited, it may be fine powder, preferably One powder having particles of 10 μm or more in 90 wt % or more.

The intermetallic compound of the present invention can be used as a catalyst for various chemical reactions. In the case where the intermetallic compound of the present invention is used as a catalyst, the intermetallic compound of the present invention can be used as it is, or can be used by being supported on various commonly used catalyst supports in a complex.

In the case where the intermetallic compound of the present invention is used as it is, the intermetallic compound can be used by using a commonly used method.

The crystallite size and the specific surface area of the catalyst at this time are not particularly limited, but may have the same values as the crystallite size and the specific surface area of the above-mentioned intermetallic compound.

The intermetallic compound of the present invention can be supported on various catalyst supports and used as a complex. The material of the catalyst supports used in the complex is not particularly limited as long as it can support the intermetallic compound of the present invention and does not inhibit the performance of the intermetallic compound of the present invention in the chemical reaction to be used. Various known catalyst supports may be used. For example, catalyst supports of inorganic oxides, for example, oxides of two or more kinds of metals such as silicon oxide (silica), zinc oxide, aluminum oxide (alumina), magnesium oxide (magnesia), indium oxide, calcium oxide, zirconium oxide (zirconia), titanium oxide (titania), hafnium oxide, barium oxide, cerium oxide (Ceria), perovskite type compounds and mayenite type compounds may be used. In addition, nitride catalyst supports such as $Ta_3N_5$, BN, and $Si_3N_4$; or carbon catalyst supports such as activated carbon, silicon carbide, and the like may be used. And a catalyst support containing two or more kinds of catalyst supports selected from the catalyst supports of the above-mentioned examples can be used.

Also, as a catalyst support, at least one or more types of the group consisting of "conductive mayenite type compound" described in the specification of WO2012/077658, "two-dimensional electride compound or precursor compound thereof" described in the specification of WO2015/129471, and "complexes" described in the specification of WO2016/088896 can be used as the catalyst support.

The complex of the present invention can be used as a catalyst.

The particle size of the catalyst support is not particularly limited, hut the catalyst support may have a large particle size and has a particle diameter similar to that of the catalyst support used.

The specific surface area of the catalyst support is not particularly limited, but the specific surface area of the catalyst support may be dominant with respect to the value of the specific surface area of the complex, so it has a specific surface area according to the specific surface area of the catalyst support used.

A complex is obtained by supporting the intermetallic compound of the present invention on a catalyst support. The complex can be used as a catalyst by physically mixing the raw material $ARu_2$ with the catalyst support. Further, the complex can be used as a catalyst by coating the material $ARu_2$ on a support such as the catalyst support or metal.

Further, a complex can be obtained by supporting a compound of metal Ru which is a component of $ARu_2$ and a compound of metal A which is a component of $ARu_2$ in the present invention, on the catalyst support by using the impregnation method, chemical vapor deposition, sputtering or the like, and then by performing hydrogen reduction. The complex can be used as a supported metal catalyst supporting $ARu_2$ particles.

The compound of metal Ru is not particularly limited, for example, an inorganic metal compound which can easily thermally decompose or an organometallic complex such as tri-ruthenium dodecacarbonyl ($[Ru_3(CO)_{12}]$), dishloro tetrakis (triphenylphosphine) ruthenium (II) ($[RuCl_2(PPh_3)_4]$), dichloro tris (triphenylphosphine) ruthenium (II) ($[RuCl_2(PPh_3)_3]$), tris (acetylacetonato) ruthenium (III) ($[Ru(acac)_3]$), ruthenocene ($[Ru(C_5H_5)]$), ruthenium chloride ($[RuCl_3]$) can be used.

As the impregnation method, the following step can be used. For example, a support powder is dispersed in a solution containing the compound of metal Ru and the compound of metal A, and the mixture is stirred. In this case, the total amount of the metal compound is not particularly limited, it may be 0.01% by mass or more with respect to the weight of the support used, preferably 0.02 wt % or more, more preferably 0.05 wt % or more, and it may be 40 wt % or less, preferably 30 wt % or less, more preferably 20 wt % or less. Thereafter, under an inert gas stream, such as argon, helium, or in a vacuum, the catalyst precursor is obtained by heating the mixture to dryness to evaporate the solvent. Temperature at this time is not particularly limited, it may be 50° C. to 200° C. The time required in the step is not particularly limited, it may be 30 minutes to 5 hours. Then, by reducing the catalyst precursor containing the dry compound of metal Ru and the compound of the metal A, a catalyst support supporting a coating of intermetallic compound $ARu_2$ can be obtained.

The intermetallic compound supported on the catalyst support obtained by the above-mentioned method, preferably after being treated by the hydrogen adsorption-desorption treatment, can be used as a catalyst in which the intermetallic compound of the present invention is supported on a catalyst support.

Since the catalyst of the present invention in which the intermetallic compound is supported is suitable for ammonia synthesis, it can be used as an ammonia synthesis catalyst.

Hereinafter, a method of producing ammonia of the present invention is described in detail.

<Synthesis of Ammonia>

In the method of producing ammonia of the present invention, the intermetallic compound of the present invention as a catalyst is used, and hydrogen and nitrogen are reacted on the catalyst to produce ammonia.

In the method of producing ammonia of present invention, when a gas containing hydrogen and nitrogen are passed into contact with the catalyst of the present invention, it is not particularly limited, normally, the catalyst is heated.

The reaction temperature is not particularly limited, it may be 200° C. or more, preferably 250° C. or more, more preferably 300° C. or more and it may be 600° C. or less, preferably 500° C. or less, more preferably 450° C. or less. Although a low-temperature region is advantageous for ammonia generation in terms of chemical equilibrium theory because ammonia synthesis is an exothermic reaction, temperature range described above is preferred in order to obtain a sufficient ammonia formation rate.

The molar ratio of nitrogen and hydrogen passed into contact with the catalyst is not particularly limited, the ratio of hydrogen to nitrogen ($H_2/N_2$ (volume/volume)) may be 0.4 or more, preferably 0.5 or more, more preferably 1 or more and it may be 10 or less, preferably 5 or less.

The reaction pressure of the ammonia production method of the present invention is not particularly limited, a pressure of the gas mixture containing nitrogen and hydrogen may be 0.01 MPa or more, preferably 0.1 MPa or more and it may be 20 MPa or less, preferably 15 MPa or less, more preferably 10 MPa or less. Since the activity of the catalyst of the present invention has high pressure dependence, in view of practical use, a pressure condition equal to or more than atmospheric pressure is preferred.

As a type of the synthetic reaction, any one of a hatch reaction type, a closed circulation system reaction type, and a flow system reaction type may be use, however, the flow system reaction type is most preferred from the practical point of view. A high pressure and low temperature condition is advantageous in ammonia synthesis reaction in terms of equilibrium. Moreover, due to the exothermic reaction, it is advantageous if the reaction is performed while removing the reaction heat. Therefore, in order to increase the yield, it is possible to use a technique industrially usually performed in the ammonia production. For example, when using a flow system reactor, a method of obtaining a high ammonia yield by lowering the inlet temperature of each reactor may include connecting several reactors filled with the catalyst in series, and installing intercoolers to the outlet of each reactor to remove heat. For another example, the method may include precisely controlling the outlet temperature of each reaction layer by using a reactor having several catalyst layers therein.

In the ammonia production method of the present invention, it is possible to perform the ammonia synthesis, in the same manner as in the conventional synthesis method, by using one type of reactor filled with catalyst, or by using several types of reactors. The fine powder catalyst of the Ru-based intermetallic compound alone or in combination of two or more catalysts selected from the fine power catalysts of Ru-based intermetallic compound, or in combination of the fine power catalysts of the Ru-based intermetallic compound and a conventional catalyst may be used. In addition, a method of connecting a plurality of reactors, and a method of providing a plurality of reaction layers in the same reactor may be used.

In the equilibrium reaction conditions of industrial ammonia synthesis, after cooling removal of the ammonia produced in the reaction gas, an unreacted raw material is purged outside by separating the reaction gas and a portion of the impurities contained in the reaction gas by using membrane separation or the like. The unreacted raw material can be recycled as a raw material.

As a hydrogen raw material used for the method of producing ammonia, it is possible to use hydrogen raw materials which can be produced through various production methods, such as a production method in which coal, petroleum or natural gas is used as a raw material; an autothermal reforming method which is obtained by combining the steam reforming and the partial oxidation; a method by combining these methods with a shift reaction; and a method of using biomass as a raw material; a method performed by water electrolysis; and a method of water decomposition performed by an optical catalyst.

As the raw material for the ammonia synthesis, material derived from the natural gas material may be used. Specifically, the hydrogen gas and the nitrogen gas may be produced through a steam reforming step of the natural gas, a partial oxidation reforming step, a CO shift reacting step, a $CO_2$ removing step, and a subsequent CO removing step performed by continuous CO methanation.

On the other hand, as a method of obtaining a raw material having higher H/N ratio in order to carry out a synthesis reaction under conditions of excess hydrogen than the stoichiometric ratio $N_2:H_2=1:3$, a method of using oxygen-enriched air has been developed. When such a raw material is used, an amount of recycled gas is decreased, and thus the aforementioned method is energetically preferred. Furthermore, a method in which, after compressing and separating the air, oxygen is used to produce hydrogen through an auto-thermal method and nitrogen is used for the reaction gas or process nitrogen is preferable from the viewpoint of the energy saving. Either method can be used as the method of producing the raw material for the present invention.

After the ammonia synthesis reaction is carried out in the above-mentioned reaction conditions by using the catalyst of the present invention, the reaction temperature is lowered to room temperature. In that case, it is possible to repeat the ammonia synthesis reaction since activity of the catalyst is recovered when the catalyst is placed on the reaction conditions again, which is preferred. This is because, in the course of lowering the reaction temperature to room temperature and then raising it again to the reaction temperature, the hydrogen adsorption amount of the intermetallic compound of the present invention changes by absorbing-desorbing hydrogen, and as a result, the activity of the catalyst is recovered by further miniaturization of the particles of the catalyst.

EXAMPLE

Hereafter, the present invention will be described in more detail based on examples. An evaluation of the ammonia synthesis activity of the catalyst was carried out by determining the ammonia synthesis rate by quantified the production of $NH_3$ by using a gas chromatograph or quantified the solution in which $NH_3$ was dissolved in the sulfuric acid aqueous solution by using ion chromatography.

(Method of Measuring BET Specific Surface Area)

BET specific surface area was measured by adsorbing nitrogen gas at liquid nitrogen temperature on the surface of the object and calculating BET specific surface area from the adsorption-desorption isothermal curve based on the adsorption-desorption of nitrogen gas at −196° C. Measurement conditions are shown below.

[Measurement Conditions]

Measurement device: high-speed and specific surface area/pore distribution measuring apparatus NOVA 4200e (Quantachrome Instruments Co., Ltd.)

Adsorbed gas: nitrogen 99.99995% by volume

Adsorption temperature: liquid nitrogen temperature −196° C.

Pretreatment: the measurement object was placed under the vacuum or reduced pressure, 130° C., and allowed to stand for 2 hours.

(Ion Chromatogram Analysis)

The ammonia gas discharged from the reaction vessel was dissolved in a 5 mM aqueous solution of sulfuric acid, and captured ammonium ion ($NH_4^+$) was analyzed by ion chromatography.

Measurement conditions are shown below.

[Measurement Conditions]

Apparatus: JASCO Corporation LC-2000 plus

Detector: electric conductivity detector CD-5 (Shodex Co., Ltd.)

Column: Ion chromatogram column (manufactured by Shimadzu Corporation)

Fluent: 3.0 mM oxalate+2.0 mM 18-crown-6-ether solution

Flow rate: 1.0 ml/min.

Column temperature: 40° C.

(Method of Measuring the Reaction Order)

Analysis of the reaction order of the ammonia synthesis reaction was carried out according to the conditions described in Applied Catalysis A: General 209(2001) pp.317 to 325. Specifically, the reaction order was determined by applying equations (1) to (13) described in item "2.3 Kinetic analysis" of the same document at page 319.

Analysis of the reaction order was carried out by measuring the value of the catalytic activity obtained by varying the partial pressure of the reactive gas under certain temperature and flow rate, and obtaining the reaction order represented by the following general formula (1).

$$r = k \cdot P_{N2}^{\alpha} \cdot P_{H2}^{\beta} \cdot P_{NH3}^{\gamma} \tag{1}$$

Here, r is the reaction rate, k is the rate constant, $P_{N2}$ is the partial pressure of nitrogen, $P_{H2}$ is the hydrogen partial pressure, $P_{NH3}$ parital pressure of ammonia, α is reaction order of nitrogen, β is reaction order of hydrogen, γ is the reaction order of ammonia.

Reaction orders of nitrogen and hydrogen were obtained by the equation (1). Reaction order of ammonia was determined by heuristics from a value obtained by subtracting one from the value of the inverse of the slope of the resulting straight line plot of ammonia abundance vs. the reciprocal of total flow.

In this measurement, in order to keep the gas flow rate constant, total flow was controlled by using Ar gas as an inert gas.

[Measurement Conditions for Nitrogen Reaction Order]

The nitrogen reaction order was determined by measuring ammonia synthesis rates by the following four flow conditions, taking the each natural logarithm plots of the nitrogen partial pressure and the ammonia synthesis rate, and calculating the nitrogen reaction order from the slope thereof.

Flow rates (ml/min) of each gas were shown as follows.
$N_2:H_2:Ar=6:30:24$
$N_2:H_2:Ar=10:30:20$
$N_2:H_2:Ar=15:30:15$
$N_2:H_2:Ar=20:30:10$

[Conditions of Measuring Hydgrogen Reaction Order]

The hydrogen reaction order was determined by measuring ammonia synthesis rates by the following four flow conditions, taking the each natural logarithm plots of the hydrogen partial pressure and the ammonia synthesis rate, and calculating the hydrogen reaction order from the slope thereof.

Flow rate (ml/min) is as follows for each gas.
$N_2:H_2:Ar=10:20:30$
$N_2:H_2:Ar=10:25:35$
$N_2:H_2:Ar=10:30:20$
$N_2:H_2:Ar=10:40:10$

[Conditions of Measuring Ammonia Reaction Order]

The ammonia reaction order was determined by measuring ammonia synthesis rates at four flow conditions as shown below, taking the natural logarithm plot of the reciprocal of the total gas flow rate and each outlet ammonia concentration, and calculating the ammonia reaction order ($\gamma$) from the slope m by using the following equation, $\gamma=1-1/m$.

Each flow rate (ml/min) for each gas were shown as follows.
$N_2:H_2:Ar=5:15:0$
$N_2:H_2:Ar=10:30:0$
$N_2:H_2:Ar=15:45:0$
$N_2:H_2:Ar=20:60:0$ (SEM, XRD)

Crystal structure of the catalytic material was measured using an X-rays diffractometer (XRD, BRUKER Co., D8 ADVANCE).

X-ray source: Cu Kα ray ($\lambda$=0.15418 nm, 40 kV, 50 mA)

Surface structure of the catalyst material was measured using a scanning electron microscopy (SEM, JEOL Ltd., JSM-7600F).

Example 1

<Synthesis of $YRu_2$ Fine Powder>

Commercial yttrium (Y) was weighed, and then in accordance with the weight of Y, commercial Ru metal was weighted so as that a molar ratio of Y and Ru was 1:2. Then a melt of $YRu_2$ was obtained by melting the mixture of Y and Ru by using an are melting method using an are melting apparatus. Then, an $YRu_2$ fine powder was obtained by cooling the melt to ambient temperature and crushing the resulting $YRu_2$ mass in a mortar.

<Hydrogen Adsorption-Desorption Treatment of the $YRu_2$ Fine Powder>

The $YRu_2$ fine powder absorbed hydrogen by raising the temperature at 5° C./min from room temperature to 500° C. under hydrogen partial pressure of 10 atm or less, and maintaining the temperature for 1.5 hours, and then cooling it to normal temperature. Then, the resulting $YRu_2$ fine powder absorbing hydrogen desorbed hydrogen by raising the temperature to 300° C. at 30° C./min from room temperature under vacuum, and then cooling it to normal temperature. As a result, a product of $YRu_2$ fine powder after hydrogen adsorption-desorption treatment was obtained.

Figure 3A:
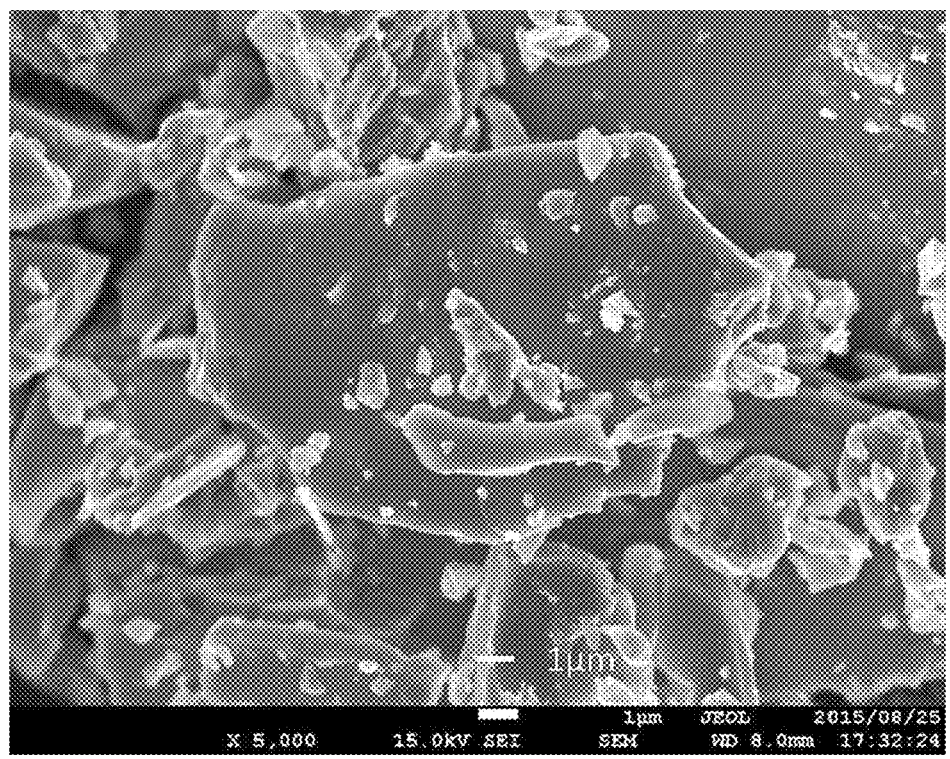
FIG. 3A is a diagram showing a measurement result of SEM before hydrogen adsorption-desorption treatment in Example 1.
Figure 3B:
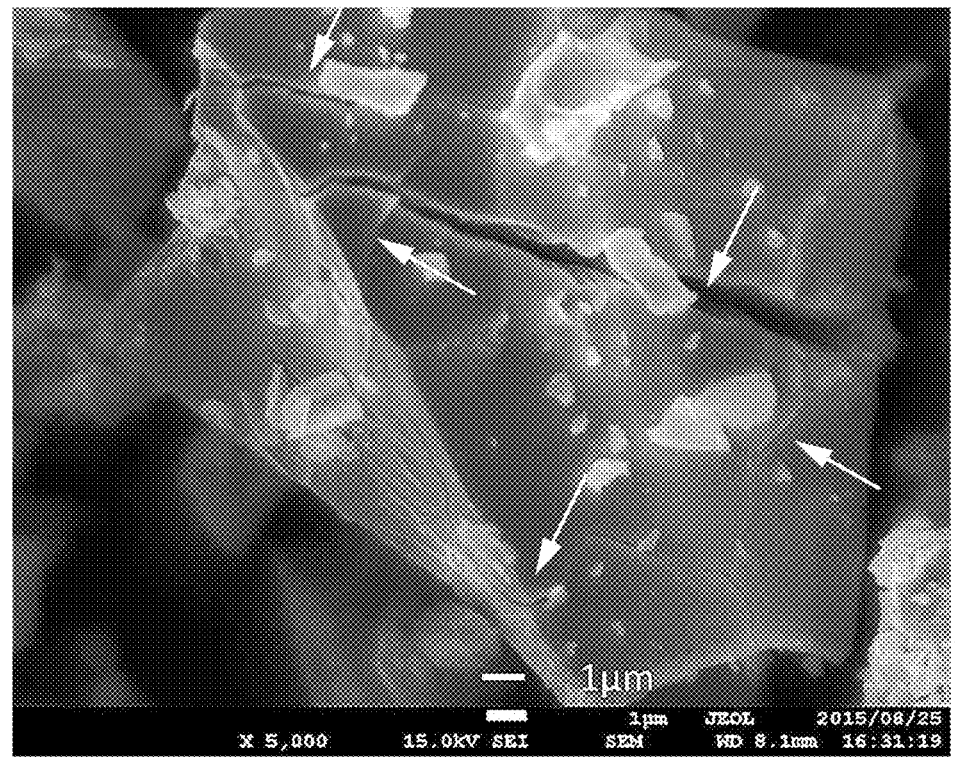
FIG. 3B is a diagram showing the measurement results of SEM after hydrogen adsorption-desorption treatment in Example 1.

As shown in FIGS. 3A and B, in which measurement results of SEM before and after hydrogen adsorption-desorption treatment were shown respectively, by analyzing the SEM photographs, change in crystal structure was not observed and it was confirmed that fine power having a size of several 10 μm contained the crack as shown by the arrow in FIG. 3B. That is, the surface area of $YRu_2$ fine power was increased.

Figure 2:
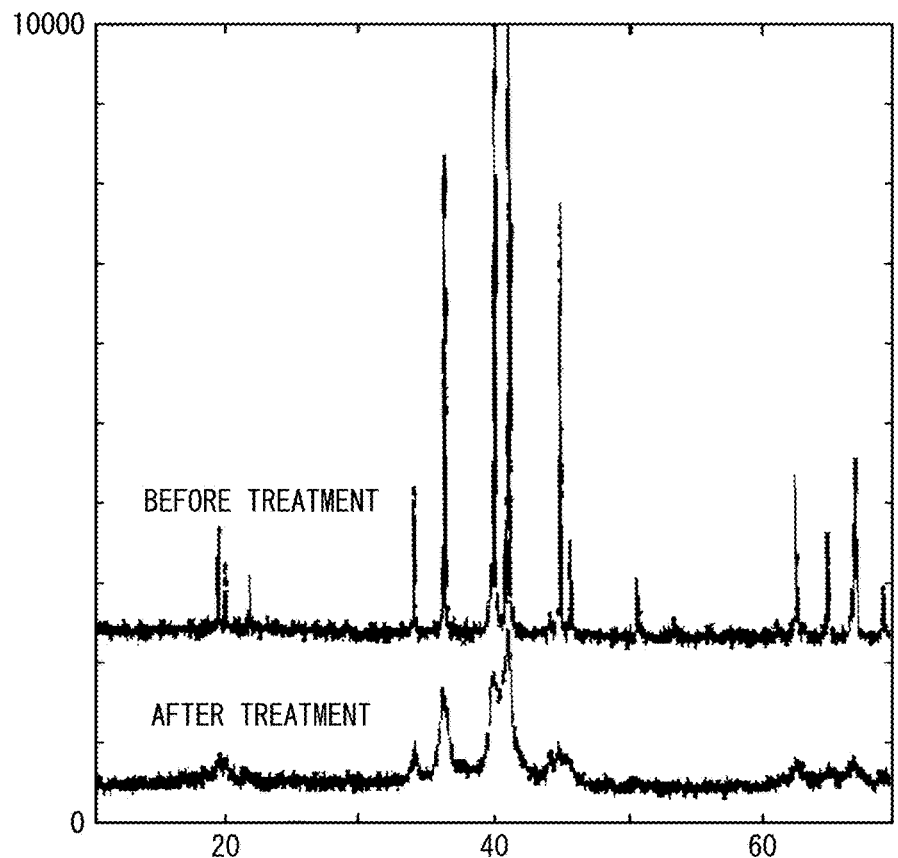
FIG. 2 is a diagram showing measurement results of XRI) before and after hydrogen adsorption-desorption treatment in Example 1.

Further, as shown in FIG. 2, by evaluating change of line width of the diffraction line of powdered XRD, it was observed that by the hydrogen adsorption-desorption treatment, crystallite size was miniaturized from 250 nm, before the hydrogen adsorption-desorption treatment, to 20 nm, after the treatment.

Example 2

<Ammonia Synthesis Reaction using the $YRu_2$ Fine Power as a Catalyst after Hydrogen Adsorption-Desorption Treatment>

The reaction was carried out to produce ammonia gas ($NH_3$) by passing nitrogen gas ($N_2$) and hydrogen gas ($H_2$) into contact with the catalyst. An $YRu_2$ fine powder was produced according to the method described in Example 1. After the ball milling, $YRu_2$ fine powder was treated by hydrogen adsorption-desorption treatment according to the method described in Example 1. The resulting $YRu_2$ fine powder 0.03 g was packed into a glass tube and was used as the catalyst in a fixed bed flow type system. The ammonia synthesis reaction was carried out by pass nitrogen gas and hydrogen gas into contact with the resulting $YRu_2$ fine powder provided in the reactor.

The ammonia synthesis reaction was carried out under a reaction temperature of 400° C.; at a flow rate of $N_2$:15 ml/min, $H_2$:45 nil/min, and a total of 60 ml/min; and at reaction pressure of atmospheric pressure. The gas coming out from the reactor was bubbled in 0.005M aqueous solution of sulfuric acid, and the resulting ammonia was dissolved in an aqueous sulfuric solution. The generated ammonium ions was determined by ion chromatography. The reaction rate of the ammonia synthesis reaction at 400° C. is 871 $\mu molg^{-1}h^{-1}$. A specific surface area of the $YRu_2$ fine power catalyst after reaction was 1.8 $m^2/g$ by BET specific surface area measurement. The results are shown in Table 1.

Example 3

<High Activity of the $YRu_2$ Catalyst after Hydrogen Adsorption-Desorption Treatment by Repeating the Ammonia Synthesis Reaction and Cooling to Room Temperature>

After an ammonia synthesis reaction was carried out under the same reaction conditions as in Example 2 by using $YRu_2$ fine power after hydrogen adsorption-desorption treatment described in Example 1 as a catalyst, the reaction temperature was lowered to room temperature. It was subsequently performed second ammonia synthesis reaction under the same reaction conditions as in Example 2 again. The reaction rate of the first ammonia synthesis reaction was 893 μmolg$^{-1}$h$^{-1}$, whereas the reaction rate of the second ammonia synthesis reaction increased to 1187 μmolg$^{-1}$h$^{-1}$. That is, the activity of catalyst per mass was increased.

Example 4

<Measurement of Reaction Orders of H$_2$, N$_2$, and NH$_3$ when using the YRu$_2$ Fine Powder after Hydrogen Adsorption-Desorption Treatment as Catalyst>

Using the same catalyst as that used in Example 2, an ammonia synthesis reaction was carried out in the same manner as Example 2 except that gas flow rates (ml/min) of N$_2$ and H$_2$ were varied in 5 ml/min to 60 ml/min.

By using the calculation formula, a reaction order of nitrogen of 0.94, a reaction order of hydrogen of 0.81, and a reaction order of ammonia of 0.73 were obtained. The results are shown in Table 2.

Example 5

<Pressure Dependence in the Ammonia Synthesis Reaction using YRu$_2$ Fine Powder after Hydrogen Adsorption-Desorption as a Catalyst>

At the reaction temperature of 380° C., ammonia synthesis reactions were carried out in the same manner as Example 2 except that the reaction pressures were 0.1 MPa, 0.4 MPa, 0.6 MPa, and 0.8 MPa.

The reaction rates of the ammonia synthesis at 380° C. and at the pressure: 0.1 MPa, 0.4 MPa, 0.6 MPa and 0.8 MPa were 453 μmolg$^{-1}$h$^{-1}$, 713 μmolg$^{-1}$h$^{-1}$, 789 μmolg$^{-1}$h$^{-1}$, and 914 μmolg$^{-1}$h$^{-1}$, respectively. The results are shown in FIG. 1. The pressure dependence is observed in the ammonia synthesis reaction using the catalyst of the present invention, the reaction rate obtained at 0.8 MPa was twice the reaction rate obtained at 0.1 MPa.

Comparative Example 1

<Ammonia Synthesis Reaction using YRu$_2$ Fine Powder Catalyst without Hydrogen Adsorption-Desorption Treatment>

Ammonia synthesis reaction was carried out in the same manner as in Example 2, by using YRu$_2$ fine powder catalyst without hydrogen adsorption-desorption treatment described in Example 1 as a catalyst. Reaction rate of ammonia synthesis at 400° C. was 233 μmolg$^{-1}$h$^{-1}$, the catalyst activity was about ¼ of Example 2. The results are shown in Table 1. Specific surface area of YRu$_2$ fine powder after reaction could not be measured due to very small.

Comparative Example 2

<Ammonia Synthesis Reaction using Ru Metal Catalyst>

Ammonia synthesis reaction was carried out in the same manner as in Example 2, except that Ru metal (Kojundo Chemical Laboratory Co., 3N, using powdered) was used as a catalyst and the amount of the catalyst was 0.5 g. The reaction rate of the ammonia synthesis reaction at 400° C. was 12 μmolg$^{-1}$h$^{-1}$. The results are shown in Table 1. The specific surface area of the Ru metal after reaction by the BET specific surface area measurement was 3.0 m$_2$/g.

Comaprative Example 3

<Reaction Orders of H$_2$, N$_2$, NH$_3$ using Ru Metal Catalyst>

The reaction order of the ammonia synthesis reaction was determined in the same manner as in Example 4, except that the metal Ru 0.5 g was used as a catalyst and the reaction temperature was 450° C.

Reaction order of nitrogen was 1.01, reaction order of hydrogen was −0.49, and reaction order of ammonia was −0.09. The results are shown in Table 2.

Comparative Example 4

<Ammonia Synthesis using Ru Metal Catalyst in Pressurized Conditions>

Ammonia synthesis reaction was carried out in the same manner as in Example 5, except that the Ru metal 0.5 g was used as a catalyst and the reaction temperature was 450° C. The reaction rate of the ammonia synthesis at 450° C., under pressure: 0.1 MPa, 0.4 MPa, 0.6 MPa, and 0.8 MPa were 46 μmolg$^{-1}$h$^{-1}$, 54 μmolg$^{-1}$h$^{-1}$, 61 μmolg$^{-1}$h$^{-1}$, 64 μmolg$^{-1}$h$^{-1}$, respectively. The reaction rates obtained at 0.8 MPa was 1.4 times higher than the reaction rate obtained at 0.1 MPa. The results are shown in FIG. 1.

[Comparison of Reaction Rates of Ammonia Synthesis]

From the measurement results of reaction rates and the catalyst surface area after the ammonia synthesis shown in Table 1, although YRu$_2$ had a specific surface area smaller than the Ru metal, the catalytic activity of YRu$_2$ is approximately 73 times per mass higher than Ru metal, and catalytic activity of YRu$_2$ per catalyst surface area after the reaction represented by the reaction rate of the ammonia synthesis per catalyst surface area after the reaction is about 130 times higher than that of Ru metal.

TABLE 1

| | Catalyst | (i) Surface Area after reaction (m$^2$/g) | (ii) Reaction rate of ammonia (μmolg$^{-1}$h$^{-1}$) | (ii)/(i) (m$^2$/g)/ (μmolg$^{-1}$h$^{-1}$) |
|---|---|---|---|---|
| Example 2 | YRu$_2$ (after hydrogen adsorption-desorption treatment) | 1.8 | 871 | 495 |
| Comparative Example 1 | YRu$_2$ (without treatment) | Cannot be measured | 233 | — |
| Comparative Example 2 | Metal Ru | 3.0 | 12 | 4 |

**Reaction Temperature: 400° C., Reaction Pressure: 0.1 MPa, Flow Rate: 60 mL/min, N$_2$:H$_2$ = 1:3(v/v)

[Comparison of the Reaction Orders of H$_2$, N$_2$, NH$_3$]

As shown in Table 2, while the Ru metal catalyst had a negative value of the reaction orders of −0.49 hydrogen, YRu$_2$ catalyst had a positive value of 0.81. As the results shown, no hydrogen poisoning occurred.

TABLE 2

| Catalyst | | Reaction temperature (° C.) | Reaction order of $N_2$ | Reaction order of $H_2$ | Reaction order of $NH_3$ |
|---|---|---|---|---|---|
| Example 4 | $YRu_2$ (after absorbtion-desorbtion treatment) | 400 | 0.94 | 0.81 | −0.73 |
| Comparative Example 2 | Metal Ru | 450 | 1.01 | −0.49 | −0.09 |

**Reaction Pressure: 0.1 MPa,

[Comparison of Reaction Rate of Ammonia Synthesis in High Pressure Conditions]

As shown in FIG. 1, while reaction rate of ammonia synthesis in high pressure condition of 0.8 MPa was twice larger that that of 0.1 MPa when $YRu_2$ catalyst was used, the reaction rate of 0.8 MPa was 1.4 times larger than that of 0.1 MPa when Ru metal catalyst was used. $YRu_2$ catalyst has a high pressure dependence of the activity compared to Ru metal catalyst. The results show that the value of the reaction order of the hydrogen was positive when $YRu_2$ catalyst was used.

Example 6

<Durability of $YRu_2$ Fine Powder Catalyst>

Figure 4:
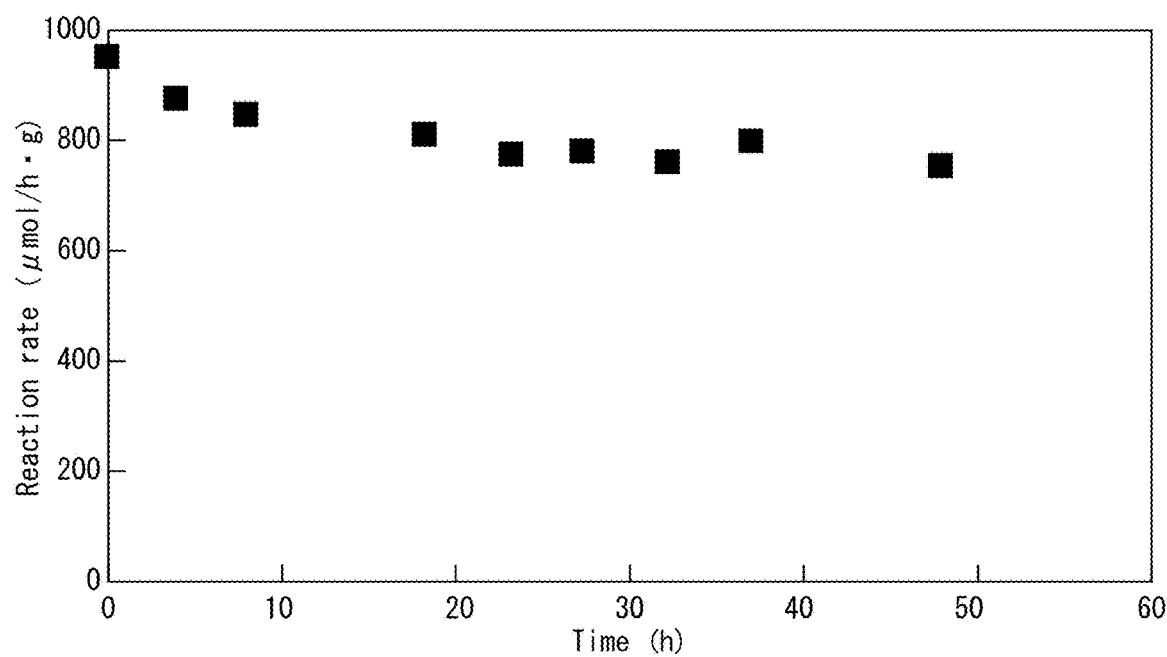
FIG. 4 is a graph showing changes with time of the ammonia synthesis rate in Example 6.
Figure 5:
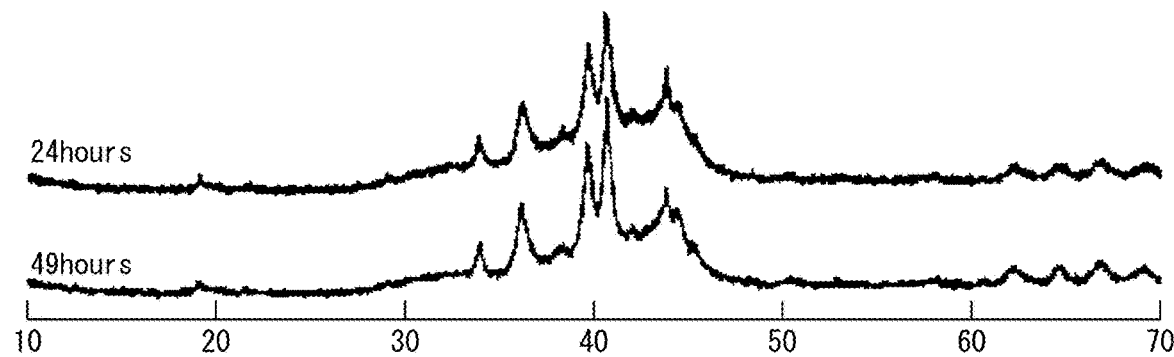
FIG. 5 is a view showing XRD measurement results of the catalyst used in Example 6 at 24 hours and 49 hours.

Ammonia synthesis reaction was carried out by using $YRu_2$ fine powder catalyst in the same manner as in Example 5, except that a reaction pressure was 0.8 MPa. As shown in FIG. 4, although up to about the first 20 hours decreased activity is observed, thereafter almost the same value of about 80% of the initial activity was shown. For example, catalytic activity measured after 23 hours is 771 $\mu molg^{-1}h^{-1}$, and catalytic activity measured after 48 hours is 750 $\mu molg^{-1}h^{-1}$. XRD was measured after 24 hours and after 49 hours, as shown in FIG. 5, since peak intensity almost did not change, $YRu_2$ fine powder maintained a crystal structure without separation between the Y and Ru.

The intermetallic compound of the present invention was found to have a hydrogen poisoning-resistant when used as an ammonia synthesis catalyst according to the comparison between Example 4 and Comparative Example 3. Therefore, it is possible to perform efficient ammonia synthesis at a high hydrogen partial pressure.

Since the intermetallic compound of the present invention can absorb and desorb hydrogen easily, hydrogen poisoning can be prevented in the synthesis reaction. By changing Ru metal to a Laves phase intermetallie compound of $ARu_2$ having hydrogen storage characteristics, ammonia synthesis activity using the intermetallic compound catalysts of the present invention are greatly improved compared to that using Ru single metal catalysts. Further, the kinetic analysis of the reaction rates of the ammonia synthesis, the catalyst used in the ammonia synthesis method of the present invention is different from the Ru metal catalyst. Since the reaction order of hydrogen is positive, it is possible to improve activity and have a higher reaction rate of ammonia synthesis reaction in the conditions of higher hydrogen partial pressure. Further, since the intermetallic compound has the property of absorbing hydrogen, the hydrogen atoms present excessively on the surface can be moved to the inside of the crystal. As a result, hydrogen poisoning can be suppressed, and activity becomes higher.

INDUSTRIAL APPLICABILITY

When the intermetallic compound of the present invention is used as a catalyst, it is possible to obtain a high yield without causing hydrogen poisoning, particularly in the ammonia synthesis reaction. In order not to cause hydrogen poisoning even in the high hydrogen pressure conditions, it is possible to promote the further reaction in the high-pressure conditions, an ammonia reaction synthesis in the high-pressure conditions can be performed with higher efficiency.

Further, it is possible to reduce the use ratio of a noble metal such as expensive Ru, and it is possible to inexpensively produce ammonia.

The invention claimed is:

1. A Laves phase intermetallic compound having a composition represented by formula $ARu_2$,
   wherein
   A is Y, Sc, or at least one lanthanoid element excluding Ce; and
   a crystallite size of the Laves phase intermetallic compound is 1 nm to 100 nm.

2. A Laves phase intermetallic compound complex, comprising
   the Laves phase intermetallic compound according to claim 1, and
   a catalyst support for supporting the intermetallic compound.

3. A catalyst, comprising a Laves phase intermetallic compound having a composition represented by formula $ARu_2$, as a catalyst active component,
   wherein
   A is Y, Sc, or at least one lanthanoid element excluding Ce; and
   a crystallite size of the Laves phase intermetallic compound is 1 nm to 100 nm.

4. The catalyst according to claim 3, wherein the catalyst active component is supported on a catalyst support.

5. The catalyst according to claim 3, wherein the catalyst is a catalyst for producing ammonia.

6. A method for producing ammonia, the method comprising:
   passing a gas containing hydrogen and nitrogen into contact with a catalyst,
   wherein
   the catalyst comprises a Laves phase intermetallic compound having a composition represented by formula $ARu_2$ as a catalyst active component;
   A is Y, Sc, or at least one lanthanoid element excluding Ce; and
   a crystallite size of the Laves phase intermetallic compound is 1 nm to 100 nm.

7. The method according to claim 6, wherein a reaction temperature of passing the gas into contact with the catalyst is 200° C. or more.

8. The method according to claim 6, wherein a reaction pressure of passing the gas into contact with the catalyst is 10 kPa to 15 MPa.

9. The method according to claim 6, wherein a volume ratio of hydrogen to nitrogen in the gas is 0.4 or more.

10. A powder comprising a Laves phase intermetallic compound having a composition represented by formula $ARu_2$, wherein A is Y, Sc, or at least one lanthanoid element excluding Ce; and a crystallite size of the Laves phase intermetallic compound is 1 nm to 100 nm.

* * * * *